(12) United States Patent
Hagiwara et al.

(10) Patent No.: US 8,107,364 B2
(45) Date of Patent: *Jan. 31, 2012

(54) COMMUNICATION APPARATUS

(75) Inventors: Shu Hagiwara, Tokyo (JP); Suguru Nishio, Fukuroi (JP); Masateru Gohno, Tokyo (JP)

(73) Assignee: Next Magic Incorporated (JP)

( * ) Notice: Subject to any disclaimer, the term of this patent is extended or adjusted under 35 U.S.C. 154(b) by 939 days.

This patent is subject to a terminal disclaimer.

(21) Appl. No.: 11/795,512

(22) PCT Filed: Feb. 2, 2006

(86) PCT No.: PCT/JP2006/001740
§ 371 (c)(1),
(2), (4) Date: Mar. 18, 2008

(87) PCT Pub. No.: WO2006/085468
PCT Pub. Date: Aug. 17, 2006

(65) Prior Publication Data
US 2009/0022081 A1  Jan. 22, 2009

(30) Foreign Application Priority Data

Feb. 10, 2005  (JP) .................................. 2005-035030

(51) Int. Cl.
*G01R 31/08* (2006.01)
*H04L 12/28* (2006.01)
(52) U.S. Cl. ........................................ 370/229; 370/401
(58) Field of Classification Search .................. None
See application file for complete search history.

(56) References Cited

U.S. PATENT DOCUMENTS

| | | | |
|---|---|---|---|
| 6,259,696 B1 * | 7/2001 | Yazaki et al. ............ 370/395.21 |
| 6,480,497 B1 | 11/2002 | Flammer, III et al. |
| 6,640,087 B2 | 10/2003 | Reed et al. |
| 6,834,329 B2 * | 12/2004 | Sasaki et al. .................. 711/134 |
| 7,382,787 B1 * | 6/2008 | Barnes et al. .................. 370/401 |
| 7,787,500 B2 * | 8/2010 | Tsuchinaga et al. .......... 370/516 |
| 2003/0014603 A1 * | 1/2003 | Sasaki et al. .................. 711/158 |
| 2004/0027990 A1 | 2/2004 | Lee et al. |
| 2005/0213571 A1 * | 9/2005 | Barrack et al. ................ 370/389 |

FOREIGN PATENT DOCUMENTS

JP  2001-274801  10/2001

* cited by examiner

*Primary Examiner* — Hassan Phillips
*Assistant Examiner* — Eunsook Choi
(74) *Attorney, Agent, or Firm* — Studebaker & Brackett PC; Donald R. Studebaker

(57) ABSTRACT

A communication apparatus having a temporary managing portion for controlling a temporary memory, a main managing portion for controlling a main memory and an operation control portion. The operation control portion is operative to cause the temporary managing portion and the main managing portion to determine the amount of reception at intervals of predetermined time and the amount of transmission at intervals of the determined time, to store comparative result data representing the result of comparison between the amount of reception and the amount of transmission in the temporary memory or the main memory, and to find an excessive input state, an excessive output state or a balanced input/output state on the basis of an excessive input communication signal reception state, an excessive output communication signal transmission state and a balanced input communication signal reception/output communication signal transmission state recognized based on the comparative result data, and operative to cause an input communication signal reception and an output communication signal transmission to be restrained in response to the found excessive input state, excessive output state or balanced input/output state.

5 Claims, 4 Drawing Sheets

US 8,107,364 B2

COMMUNICATION APPARATUS

TECHNICAL FIELD

The present invention relates to a communication apparatus which can be applied, for example, to constitute a relay node provided for relaying information signals in a communication network wherein mutual communication between two communication terminals or among a plurality of communication terminals is performed.

TECHNICAL BACKGROUND

Mutual information signal communication between two communication terminals, such as portable telephones, personal computers or the like, is usually carried out through a predetermined communication network in the form of wireless system or wire system. There has been proposed a wireless communication network by the name of mesh network as one of relatively new communication networks of such a kind.

The mesh network is different from known communication networks each constituted with a base node which functions as a central controller and a plurality of relay nodes which are under the control by the base node. In the mesh network, any node corresponding to the base node functioning as the central controller is not provided but a plurality of relay nodes are provided in such a manner that each contiguous two of the relay nodes are placed with their communication areas overlapping partially with each other so that communication paths extend in a reticulated pattern. With the mesh network, the following advantages can be obtained. For example, when a certain one of the relay nodes provided in the mesh network is put in an obstructive condition for interrupting communication temporarily, the communication is rapidly revived through another relay node provided in the mesh network. In addition, it is easy to add a new relay node to the network.

With regard to the mesh network as mentioned above, various technical improvements have been proposed. For example, with one of such technical improvements, a communication signal which is received and transmitted by each of the relay nodes provided in the mesh network is changed in its signal characteristics, such as a rate of signal, a manner of modulation, a frequency band and so on, in response to the signal receiving capacity of the relay node so that the amount of information processed in a predetermined time in the mesh network is increased (as disclosed in, for example, patent document 1). Further, with another technical improvement, each of the relay nodes constituting the mesh network is provided with a directive antenna system and the directivity of antenna determined by the directive antenna system is selected in response to the communication carried out through the subject relay node so that the communication efficacy in the mesh network is improved (as disclosed in, for example, patent document 2).

The patent document 1: U.S. Pat. No. 6,480,497
The patent document 2: U.S. Pat. No. 6,640,087

DISCLOSURE OF THE INVENTION

Problems Intended to be Solved by the Invention

In the mesh network, there are also several problems apart from the above mentioned advantages. For example, although a plurality of relay nodes constituting the mesh network are spread over a relatively broad area, communication signals transferred in the mesh network are usually relayed through the shortest path and thereby undesirable convergence of the communication traffic is induced at a specific one of the relay nodes. The specific relay node at which the convergence of the communication traffic is induced forms a bottleneck in the mesh network and a condition wherein the specific relay node loses its function for receiving or transmitting the communication signals is brought about when the convergence of the communication traffic comes to excessive. Then, when the relay nodes each forming the bottleneck in such a manner as mentioned above appear at a plurality of locations in the mesh network, those relay nodes exert a bad influence upon the whole mesh network and, in the worst case, it is feared that the whole mesh network ceases to function correctly.

Since the mesh network is practically constituted with the relay nodes, in the last analysis, the above mentioned problems brought about in the mesh network results from the function which each of the relay nodes constituting the mesh network has to be fulfilled.

Accordingly, it is an object of the present invention to provide a communication apparatus which can be applied to constitute each of relay nodes provided to constitute a novel communication network, with which advantages exceeding the advantages obtained with the known mesh network are obtained, and which avoids surely and effectively problems brought about by one or more bottlenecks formed in the communication network to result from the convergence of the communication traffic induced in one or more relay nodes in the communication network.

Approach to Solve the Problems

According to the invention there is provided a communication apparatus comprising a signal receiving and transmitting portion operative to receive an input communication signal for obtaining an input information signal and to transmit an output communication signal based on an output information signal; a reassembling and segmenting portion operative to cause the input information signal to be subjected to reassembling process for obtaining a first framed data which forms a data frame containing a header segment wherein identification information is provided and an information segment wherein communication information is provided and to cause a second framed data which forms a data frame containing a frame header segment wherein processed identification information is provided and an information segment wherein communication information is provided to be subjected to segmenting process for obtaining the output information signal; temporary memory means for storing temporarily the first framed data obtained from the reassembling and segmenting portion and for storing temporarily the second framed data and then discharging the second framed data stored therein to the reassembling and segmenting portion; main memory means for storing the identification information contained in the first framed data in the temporary memory means and read from the temporary memory means to preserve the same as an arranged information and for discharging the identification information stored therein or the identification information having been subjected to modifying process to the temporary memory means as the processed identification information, a temporary managing portion operative to control operations in the temporary memory means for storing temporarily therein the first and second framed data; a main managing portion operative to control operations in the main memory means for storing and preserving the identification information and discharging the processed identification information; an operation control portion operative to cause the temporary managing portion and the main managing portion to determine the amount of input communication signal reception and the amount of output communication signal transmission on the basis of the amount of first framed data storage at intervals of predetermined time and the amount of second framed data discharge at intervals of predetermined time, to compare the amount of input communication signal reception with the amount of output communication signal transmission, and to store comparative result data representing the result of the comparison in the temporary memory means or the main memory means, operative to find an excessive input state, an excessive output state or a balanced input/output state on the basis of an excessive input communication signal reception state, an excessive output communication signal transmission state and a balanced input communication signal reception/output communication signal transmission state recognized based on the comparative result data stored in the temporary memory means or the main memory means, and operative to cause the input communication signal reception and the output communication signal transmission to be restrained in response to the found excessive input state, excessive output state or balanced input/output state.

Especially, in one embodiment of communication apparatus according to the invention claimed in claim 2 of this application, the temporary managing portion is operative to show the amount of first framed data storage at intervals of predetermined time with reception amount data and the amount of second framed data discharge at intervals of predetermined time with discharge amount data.

In the communication apparatus according to the present invention thus constituted, the input information signal is obtained from the input communication signal in the signal receiving and transmitting portion. Then, the first framed data are produced based on the input information signal from the signal receiving and transmitting portion in the reassembling and segmenting portion to be stored in the temporary memory means. The identification information contained in the first framed data in the temporary memory means is read from the temporary memory means to be stored in the main memory means. The identification information stored in the main memory means is preserved as the arranged information in the main memory means and then subjected to the modifying process to be stored as the processed identification information in the temporary memory means or stored as the processed identification information in the temporary memory means without being subjected to the modifying process. The processed identification information stored in the temporary memory means is applied for forming the second framed data to be contained in the same and the second framed data are discharged to the reassembling and segmenting portion. The output information signal is produced on the basis of the communication information contained in the second framed data in the reassembling and segmenting portion and the output communication signal obtained from the output information signal is transmitted through the signal receiving and transmitting portion.

Under such a situation as mentioned above, the temporary managing portion and the main managing portion which are operative to control the temporary memory means and the main memory means, respectively, operate under the control by the operation control portion as follows. First, the temporary managing portion and the main managing portion determine the amount of input communication signal reception and the amount of output communication signal transmission on the basis of the amount of first framed data storage at intervals of predetermined time and the amount of second framed data discharge at intervals of predetermined time, compare the amount of input communication signal reception with the amount of output communication signal transmission, and cause the comparative result data representing the result of the comparison to be stored in the temporary memory means or the main memory means. At that occasion, for example, the amount of first framed data storage at intervals of predetermined time is shown with the reception amount data and the amount of second framed data discharge at intervals of predetermined time is shown with the discharge amount data. Then, the temporary managing portion and the main managing portion find the excessive input state, the excessive output state or the balanced input/output state on the basis of the excessive input communication signal reception state, the excessive output communication signal transmission state and the balanced input communication signal reception/output communication signal transmission state recognized based on the comparative result data stored in the temporary memory means or the main memory means, and then, cause the input communication signal reception and the output communication signal transmission to be restrained in response to the found excessive input state, excessive output state or balanced input/output state.

EFFECT AND ADVANTAGES OF THE INVENTION

With the communication apparatus according to the present invention, the arriving input communication signal is received and then the processed identification information is obtained by causing the identification information which is contained in the received input communication signal to accompany with the communication information to be subjected to the modifying process or without modifying the identification information, so that the output communication signal containing the processed identification information and the communication information is produced, as a communication signal based on the arriving input communication signal, to be transmitted. Accordingly, a communication network can be constituted with a plurality of communication apparatus according to the present invention which are dispersedly arranged for functioning as relay nodes in such a manner that a communication link is formed between each mutually contiguous two of the communication apparatus.

In the communication network constituted with the relay nodes arranged dispersedly, each of which is constituted with the communication apparatus according to the present invention, the following advantages exceeding the advantages obtained with the known mesh network can be obtained. That is, channel information which is information of communication paths in the communication network from a transmitting communication terminal to a receiving communication terminal is not interchanged frequently between each contiguous two of the relay nodes and therefore the traffic of adjunctive information other than the traffic of essential communication information does not increase so that the communication efficiency in the communication network is not lowered. Besides, network control information about positions of the relay nodes, a linking condition among the relay nodes and so on is not communicated frequently between each contiguous two of the relay nodes even if the number of the relay nodes in the communication network increases and therefore a problem that the amount of data of the network control information increases undesirably so that the communication network is made unstable is not brought about.

Further, with the communication apparatus according to the present invention, the excessive input communication signal reception state, the excessive output communication signal transmission state and the balanced input communication signal reception/output communication signal transmission state is recognized, and the excessive input state, the excessive output state or the balanced input/output state is found at intervals of predetermined time on the basis of the excessive input communication signal reception state, the excessive output communication signal transmission state and the balanced input communication signal reception/output communication signal transmission state, so that the input communication signal reception and the output communication signal transmission are restrained in response to the found excessive input state, excessive output state or balanced input/output state. As a result, in the communication network constituted with the relay nodes arranged dispersedly, each of which is constituted with the communication apparatus according to the present invention, the problems brought about by one or more bottlenecks formed in the communication network to result from the convergence of the communication traffic induced in one or more relay nodes in the communication network are avoided surely and effectively.

Consequently, the communication apparatus according to the present invention can be applied to constitute each of the relay nodes provided to constitute the novel communication network, with which such advantages exceeding the advantages obtained with the known mesh network as to avoid the problem that the traffic of adjunctive information other than the traffic of essential communication information increases undesirably so that communication efficiency in the communication network is lowered and the problem that the amount of date of the network control information increases undesirably so that the communication network is made unstable are obtained, and which avoids surely and effectively the problems brought about by one or more bottlenecks formed in the communication network to result from the convergence of the communication traffic induced in one or more relay nodes in the communication network.

DESCRIPTION OF REFERENCES IN THE DRAWINGS

11a~11i . . . relay nodes, 12, 13a to 13n . . . signal receiving and transmitting portions, 14 . . . reassembling and segmenting portion, 15 . . . temporary memory means, 16 . . . temporary managing portion, 17 . . . main memory means, 18 . . . main managing portion, 20 . . . operation control portion

EMBODIMENT MOST PREFERABLE FOR WORKING OF THE INVENTION

An embodiment most preferable for the working of the present invention will be explained below.

Figure 1:
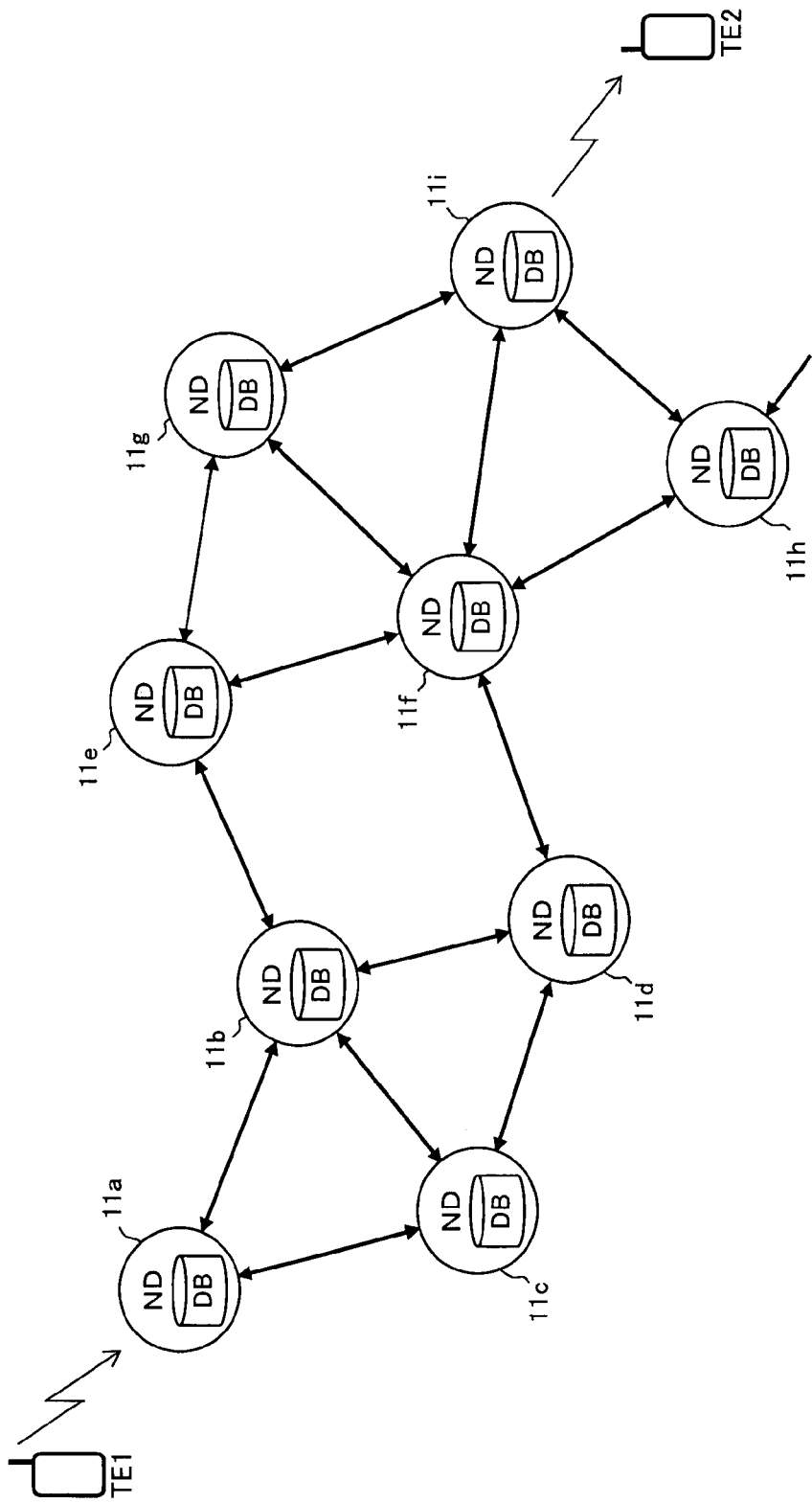
FIG. 1 is a schematic illustration showing an example of a communication network constituted with a plurality of relay nodes, each of which is constituted with an embodiment of communication apparatus according to the present invention.

FIG. 1 shows an example of a communication network constituted with a plurality of relay nodes, each of which is able to be constituted with a communication apparatus according to the present invention.

In the communication network shown in FIG. 1, a plurality of relay nodes 11a~11i, each of which is labeled "ND", are dispersedly arranged in such a manner that each contiguous two of the relay nodes 11a~11i are placed with their communication areas overlapping partially with each other. Two of the relay nodes 11a~11i interconnected with a solid arrow in FIG. 1 are contiguous to each other and operative to communicate mutually. Each of the relay nodes 11a~11i has a history database DB which is constituted with memory means storing history data related to a communication signal arriving thereat, as explained later.

One or more communication terminals, such as portable telephones, personal computers or the like, are registered at each of the relay nodes 11a~11i or some of the relay nodes 11a~11i to be under the control of the same. Each of the communication terminals is discriminated with identification information of its own.

When an information communication from a communication terminal TE1 under the control of the relay node 11a to another communication terminal TE2 under the control of the relay node 11i is intended to be done, a communication signal destined for the communication terminal TE2 is transmitted from the communication terminal TE1 through a communication path passing in succession, for example, the relay nodes 11a, 11b, 11e, 11f and 11i to the communication terminal TE2. In each of the relay nodes 11a, 11b, 11e, 11f and 11i, various kinds of identification information contained in the communication signal arriving thereat are processed with reference to the history data preserved in the history database DB and then the arriving communication signal is relayed to another of the relay nodes 11a, 11b, 11e, 11f and 11i or the communication terminal TE2.

Embodiment

Figure 2:
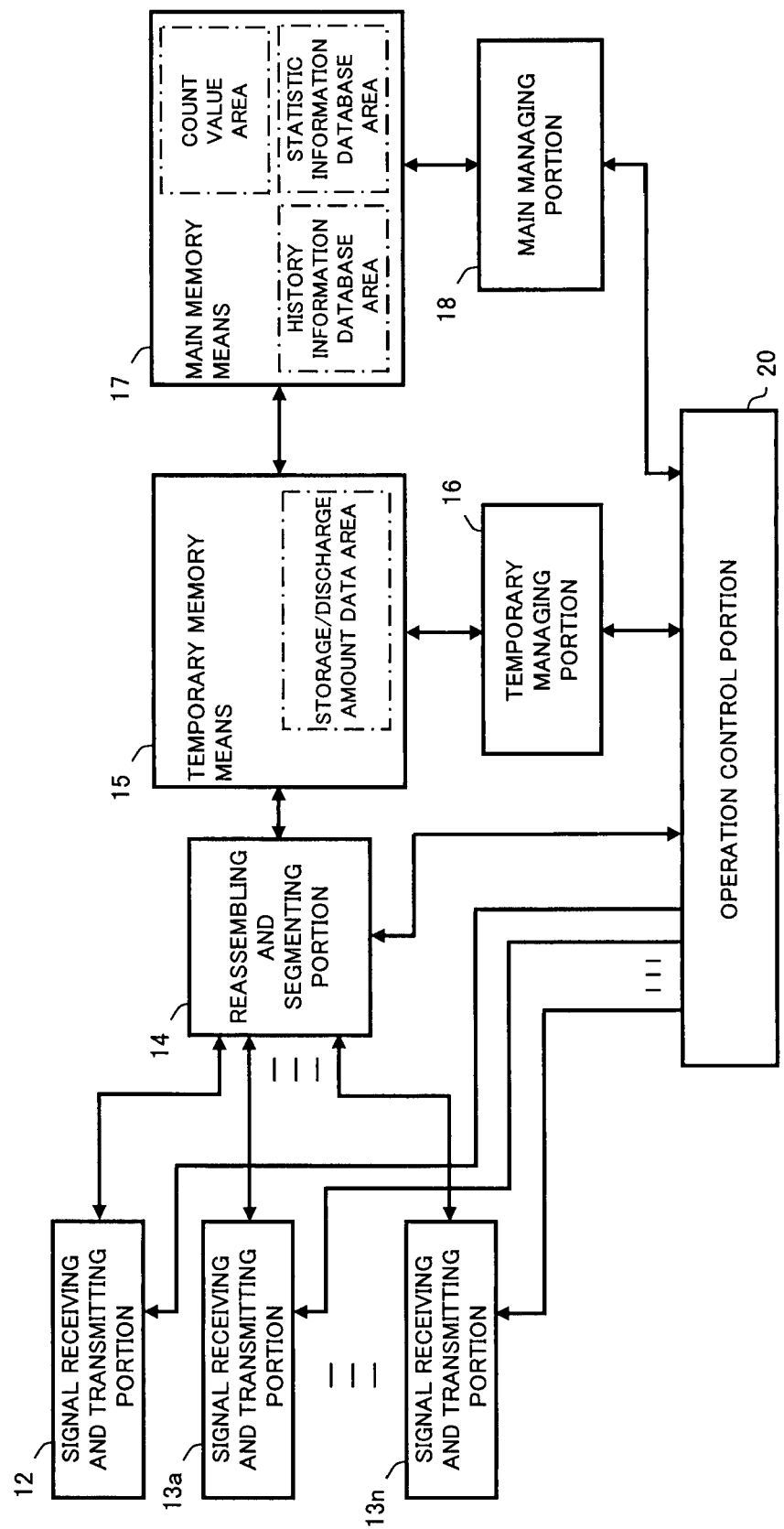
FIG. 2 is a schematic block diagram showing the embodiment of communication apparatus according to the present invention.

FIG. 2 shows an embodiment of communication apparatus according to the present invention, which can be applied to constitute each of the relay nodes 11a~11i shown in FIG. 1.

The embodiment shown in FIG. 2, which constitutes a rely node, such as one of the relay nodes 11a~11i, comprises a signal receiving and transmitting portion 12 for communication terminals and a plurality of signal receiving and transmitting portions 13a to 13n for relay nodes. The signal receiving and transmitting portion 12 is provided for communicating with communication terminals registered at the relay node constituted with the embodiment shown in FIG. 2 and operative to receive a communication signal from one of the communication terminals and to transmit an output communication signal to the communication terminals. Each of the signal receiving and transmitting portions 13a to 13n is provided for communicating with additional relay nodes each contiguous to the relay node constituted with the embodiment shown in FIG. 2 and operative to receive an input communication signal from one of the additional relay nodes and to transmit an output communication signal to the additional relay nodes.

Each of the signal receiving and transmitting portions 12 and 13a to 13n, which receives the input communication signal, produces an input information signal based on the input communication signal received thereby and supplies a reassembling and segmenting portion 14 with the input information signal.

Figure 3:
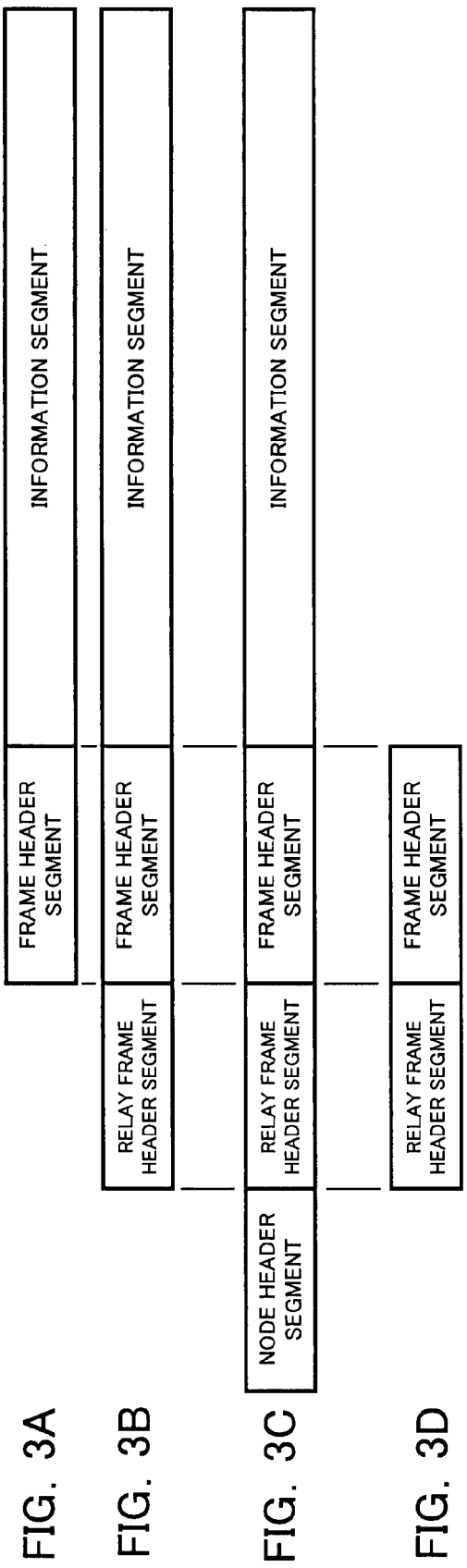
FIGS. 3A to 3D are schematic illustrations showing examples of data formats each representing an allocation of framed data or a part of the framed data obtained in the embodiment shown in FIG. 2.

When the input information signal is supplied to the reassembling and segmenting portion 14 from the signal receiving and transmitting portion 12, the reassembling and segmenting portion 14 is operative to cause the input information signal to be subjected to reassembling process so as to produce framed data for storage which form a data frame containing a frame header segment and an information segment successive to the frame header segment, as shown in FIG. 3A, on the basis of the input information signal from the signal receiving and transmitting portion 12. In the data frame shown in FIG. 3A, various kinds of identification information, such as identification information representing a transmission source of the input information signal supplied to the reassembling and segmenting portion 14, identification information representing a destination of the input information signal supplied to the reassembling and segmenting portion 14, and so on, are provided in the frame header segment, and communication information which is transferred by the input information signal supplied to the reassembling and segmenting portion 14 is provided in the information segment.

When the input information signal is supplied to the reassembling and segmenting portion 14 from one of the signal receiving and transmitting portions 13a to 13n, the reassembling and segmenting portion 14 is operative to cause the input information signal to be subjected to reassembling process so as to produce framed data for storage which form a data frame containing a relay frame header segment, a frame header segment successive to the relay frame header segment and an information segment successive to the frame header segment, as shown in FIG. 3B, on the basis of the input information signal from one of the signal receiving and transmitting portions 13a to 13n. In the data frame shown in FIG. 3B, identification information related to relay nodes, through each of which the input information signal supplied to the reassembling and segmenting portion 14 has passed, and so on, are provided in the relay frame header segment, then, various kinds of identification information, such as identification information representing a transmission source of the input information signal supplied to the reassembling and segmenting portion 14, identification information representing a destination of the input information signal supplied to the reassembling and segmenting portion 14, and so on, are provided in the frame header segment, and communication information which is transferred by the input information signal supplied to the reassembling and segmenting portion 14 is provided in the information segment.

Further, when the framed data for storage are so produced as to form the data frame containing the frame header segment and the information segment successive to the frame header segment, as shown in FIG. 3A, the reassembling and segmenting portion 14 is further operative to add a new relay frame header segment to the data frame containing the frame header segment and the information segment successive to the frame header segment so that the data frame containing the relay frame header segment, the frame header segment successive to the relay frame header segment and the information segment successive to the frame header segment, as shown in FIG. 3B, is formed. This means that the reassembling and segmenting portion 14 produces the framed data for storage which form the data frame containing the relay frame header segment, the frame header segment successive to the relay frame header segment and the information segment successive to the frame header segment, as shown in FIG. 3B, in either case wherein the input information signal is supplied to the reassembling and segmenting portion 14 from the signal receiving and transmitting portion 12 or the input information signal is supplied to the reassembling and segmenting portion 14 from one of the signal receiving and transmitting portions 13a to 13n. The framed data for storage thus produced by the reassembling and segmenting portion 14 are supplied to temporary memory means 15.

Each of the signal receiving and transmitting portion 12 for communication terminals, the signal receiving and transmitting portions 13a to 13n for relay nodes and the reassembling and segmenting portion 14 operates under the control by an operation control portion 20. The temporary memory means 15 stores the framed data for storage therein under the control by a temporary managing portion 16 which is provided exclusively for the temporary memory means 15. The temporary managing portion 16 operates under the control by the operation control portion 20.

The temporary managing portion 16 is operative to add a node header segment, which is used only in the relay node constituted with the embodiment shown in FIG. 2, to the data frame of the framed data for storage stored in the temporary memory means 15. Therefore, the framed data for storage stored in the temporary managing portion 16 form a data frame containing the node header segment, the relay frame header segment successive to the node header segment, the frame header segment successive to the relay frame header segment and information segment successive to the frame header segment, as shown in FIG. 3C. In the node header segment, identification information representing a processing situation of the framed data for storage, such as a situation wherein the framed data for storage have not been processed yet, a situation wherein the framed data for storage are in process or a situation wherein the framed data for storage have been processed, and various kinds of other identification information, such as time information of the process to which the framed data for storage are subjected, various graphic information, and so on, are provided.

The temporary managing portion 16 is operative to scan the identification information provided in the node header segment, the relay frame header segment and the frame header segment contained in the data frame of the framed data for storage stored in the temporary memory means 15 in order to determine whether the identification information in the node header segment represents a situation wherein transferred communication information has been renewed or not, whether the identification information in the relay frame header segment represents a situation wherein transferred communication information should be further transferred compulsorily or is able to be disused or not, and whether the identification information in the frame header segment represents a situation wherein communication information destined for a communication terminal belonging to the relay node constituted with the embodiment shown in FIG. 2 exists or not. Then, for example, when the identification information in the relay frame header segment represents the situation wherein the transferred communication information should be further transferred compulsorily, the temporary managing portion 16 is operative to discharge the framed data for storage stored in the temporary memory means 15 to the reassembling and segmenting portion 14 as framed data for discharge. The reassembling and segmenting portion 14 is operative to cause the framed data for discharge from the temporary memory means 15 to be subjected to segmenting process for producing an output information signal based on the framed data for discharge and to supply one of the signal receiving and transmitting portions 13a to 13n with the output information signal. The selected one of the signal receiving and transmitting portions 13a to 13n to which the output information signal is supplied is operative to produce an output communication signal based on the output information signal and then transmit the output communication signal to other relay nodes each contiguous to the relay node constituted with the embodiment shown in FIG. 2.

In such a case as mentioned above, each of the reassembling and segmenting portion 14 and the selected one of the signal receiving and transmitting portions 13a to 13n operates also under the control by the operation control portion 20.

Further, for example, when the identification information in the relay frame header segment does not represent the situation wherein the transferred communication information should be further transferred compulsorily nor the situation wherein the transferred communication information is able to be disused, the temporary managing portion 16 is operative to read the identification information in each of the relay frame header segment and the frame header segment contained in the data frame of the framed data for storage from the temporary memory means 15 to be stored in main memory means 17. Therefore, the identification information provided in each of the relay frame header segment and the frame header segment shown in FIG. 3D is stored in the main memory means 17. The main memory means 17 stores the identification information provided in each of the relay frame header segment and the frame header segment therein under the control by a main managing portion 18 which is provided exclusively for the main memory means 17. The main managing portion 18 operates also under the control by the operation control portion 20.

The temporary managing portion 16 is further operative to provide the node header segment remaining in the temporary memory means 15 with identification information representing a state of waiting for a decision by the main managing portion 18.

The main managing portion 18 is operative to cause the identification information in each of the relay frame header segment and the frame header segment stored in the main memory means 17 to be preserved as arranged history information in a history information database area provided in the main memory means 17. Therefore, in the history information database area provided in the main memory means 17, the history information database wherein the identification information in each of the relay frame header segment and the frame header segment which had been stored in the main memory means 17 in the past has been preserved as the history information is constituted.

The main managing portion 18 is further operative to compare the identification information in each of the relay frame header segment and the frame header segment stored newly in the main memory means 17 with the history information preserved in the history information database area provided in the main memory means 17 to have the result of the comparison. Then, the main managing portion 18 decides, on the basis of the result of the comparison, for example, whether a transmission source of the input information signal, from which the identification information in each of the relay frame header segment and the frame header segment is obtained, is a communication terminal belonging to the relay node constituted with the embodiment shown in FIG. 2 or not, whether a destination of the input information signal, from which the identification information in each of the relay frame header segment and the frame header segment is obtained, is a communication terminal belonging to the relay node constituted with the embodiment shown in FIG. 2 or not, whether the input information signal, from which the identification information in each of the relay frame header segment and the frame header segment is obtained, has arrived at the relay node constituted with the embodiment shown in FIG. 2 or not, and so on, to make decisions of the input information signal.

Further, the identification information in each of the relay frame header segment and the frame header segment stored in the main memory means 17 is subjected, as occasion demands, by the main managing portion 18, to modifying process by which the identification information in each of the relay frame header segment and the frame header segment is modified, as occasion demands, in response to the decisions of the input information signal, or added, as occasion demands, a flag responding to the decisions of the input information signal. Then, the identification information in each of the relay frame header segment and the frame header segment having been subjected, as occasion demands, to the modifying process, is discharged as processed identification information from the main memory means 17 to the temporary memory means 15 by the main managing portion 18.

That is, the main memory means 17 stores the identification information provided in the data frame of the framed data for storage stored in the temporary memory means 15 and read from the temporary memory means 15 so as to preserve the same as the arranged history information in the history information database area and then discharges the identification information stored therein or the identification information having been subjected to the modifying process to the temporary memory means 15 as the processed identification information, under the control by the main managing portion 18. As a result, the processed identification information is transferred from the main memory means 17 to the temporary memory means 15.

When the processed identification information has been transferred from the main memory means 17 to the temporary memory means 15, the temporary managing portion 16 is operative to provide the relay frame header segment and the frame header segment provided in the framed data for storage stored in the temporary memory means 15, in the node header segment of which the identification information representing the state of waiting for the decision by the main managing portion 18 is provided, with the processed identification information transferred thereto, and to remove the node header segment from the subject framed data for storage. Thereby, framed data for discharge which form a data frame containing the relay frame header segment and the frame header segment, in which the processed identification information is provided, and the information segment in which the communication information is provided are produced. The framed data for discharge thus produced are discharged from the temporary memory means 15 to the reassembling and segmenting portion 14 by the temporary managing portion 16.

That is, the temporary memory means 15 stores temporarily the framed data for storage from the reassembling and segmenting portion 14 and further stores temporarily the framed data for discharge which form the data frame containing the relay frame header segment and the frame header segment, in which the processed identification information is provided, and the information segment in which the communication information is provided and then discharges the framed data for discharge to the reassembling and segmenting portion 14, under the control by the temporary managing portion 16.

The reassembling and segmenting portion 14 is operative to cause the framed data for discharge from the temporary memory means 15 to be subjected to segmenting process for producing an output information signal based on the framed data for discharge and to supply one of the signal receiving and transmitting portions 12 and 13a to 13n with the output information signal in response to the processed identification information contained in the data frame of the framed data for discharge. The selected one of the signal receiving and transmitting portions 12 and 13a to 13n to which the output information signal is supplied is operative to produce an output communication signal based on the output information signal and then transmit the output communication signal to a communication terminal belonging to the relay node constituted with the embodiment shown in FIG. 2 or other relay nodes each contiguous to the relay node constituted with the embodiment shown in FIG. 2.

As described above, in the relay node constituted with the embodiment shown in FIG. 2 to be provided for relaying the communication information, the operation control portion 20 which controls the temporary managing portion 16 and the main managing portion 18 causes the temporary managing portion 16 and the main managing portion 18 to carry out the below-mentioned operations, in addition to the control operations for storing temporarily the framed data for storage and the framed data for discharge in the temporary memory means 15 and the control operations for storing and preserving the identification information in the main memory means 17 and discharging the processed identification information from the main memory means 17. That is, the temporary managing portion 16 and the main managing portion 18 carry out the below-mentioned operations under the control by the operation control portion 20.

The temporary managing portion 16 detects the amount of storage of the framed data for storage in the temporary memory means 15 at intervals of predetermined time by measuring the number of data frames (in case of fixed length data frames) or the amount of data (in case of variable length data frames) of the framed data for storage at intervals of the predetermined time and further detects the amount of discharge of the framed data for discharge from the temporary memory means 15 at intervals of predetermined time by measuring the number of data frames (in case of fixed length data frames) or the amount of data (in case of variable length data frames) of the framed data for discharge at intervals of the predetermined time. Then, the temporary managing portion 16 obtains storage amount data representing the result of the measurement of the number of data frames or the amount of data of the framed data for storage at intervals of the predetermined time and discharge amount data representing the result of the measurement of the number of data frames or the amount of data of the framed data for discharge at intervals of the predetermined time. The storage amount data and the discharge amount data thus obtained are stored in a storage/discharge amount data area provided in the temporary memory means 15 and then discharged from the temporary memory means 15 to the main memory means 17 by the temporary managing portion 16 under the control by the operation control portion 20.

Although the storage/discharge amount data area is provided in the temporary memory means 15 in the embodiment shown in FIG. 2, it is also possible to provide the storage/discharge amount data area in the main memory means 17 instead of the temporary memory means 15. In such a case, the storage amount data and the discharge amount data obtained by the temporary managing portion 16 are stored in the storage/discharge amount data area provided in the main memory means 17 by the main managing portion 18.

The main managing portion 18 determines the amount of input communication signal reception (hereinafter, referred merely to the amount of reception) and the amount of output communication signal transmission (hereinafter, referred merely to the amount of transmission) in the form of a reception count value and a transmission count value each having a predetermined initial value and stored in a statistic information database area provided in the main memory means 17 on the basis of the storage amount data and discharge amount data discharged from the temporary memory means 15 to the main memory means 17 (or stored in the storage/discharge amount data area provided in the main memory means 17).

In such a situation, the main managing portion 18 is operative to compare each successive two of the storage amount data with each other and to decrease the reception count value by 1 when the value represented by the antecedent storage amount data is larger than the value represented by the sequent storage amount data, increase the reception count value by 1 when the value represented by the antecedent storage amount data is smaller than the value represented by the sequent storage amount data and leave the reception count value as it is when the value represented by the antecedent storage amount data is equal to the value represented by the sequent storage amount data. As a result, the reception count values varying at successive intervals are obtained as the amount of reception. Similarly, the main managing portion 18 is operative to compare each successive two of the discharge amount data with each other and to decrease the transmission count value by 1 when the value represented by the antecedent transmission amount data is larger than the value represented by the sequent transmission amount data, increase the transmission count value by 1 when the value represented by the antecedent transmission amount data is smaller than the value represented by the sequent transmission amount data and leave the transmission count value as it is when the value represented by the antecedent transmission amount data is equal to the value represented by the sequent transmission amount data. As a result, the transmission count values varying at successive intervals are obtained as the amount of transmission.

The main managing portion 18 is further operative to compare the reception count value representing the amount of reception with the transmission count value representing the amount of transmission at intervals of predetermined time to obtain comparative result data representing the result of the comparison and to store the comparative result data in the statistic information database area provided in the main memory means 17. Then, the main managing portion 18 recognizes an excessive input communication signal reception state, an excessive output communication signal transmission state and a balanced input communication signal reception/output communication signal transmission state on the basis of the comparative result data at intervals of the predetermined time. Such recognition of states is carried out by perceiving the excessive input communication signal reception state when the comparative result data represent that the reception count value is larger that the transmission count value, perceiving the excessive output communication signal transmission state when the comparative result data represent that the reception count value is smaller that the transmission count value, and perceiving the balanced input communication signal reception/output communication signal transmission state when the comparative result data represent that the reception count value is equal to the transmission count value.

The main managing portion 18 puts the excessive input communication signal reception state, the excessive output communication signal transmission state and the balanced input communication signal reception/output communication signal transmission state thus recognized on record with a balanced state count value, an accumulated 1 count value, an accumulated 0 count value, an accumulated −1 count value and a synthetic accumulated value stored in a count value area provided in the main memory means 17. The balanced state count value is set at intervals of predetermined time to take 1 when the excessive input communication signal reception state is recognized, to take −1 when the excessive output communication signal transmission state is recognized and to take 0 when the balanced input communication signal reception/output communication signal transmission state is recognized. The accumulated 1 count value is set at intervals of the predetermined time to take a value obtained by accumulating the number of 1 which the balanced state count value takes. The accumulated 0 count value is set at intervals of the predetermined time to take a value obtained by accumulating the number of 0 which the balanced state count value takes The accumulated −1 count value is set at intervals of the predetermined time to take a value obtained by accumulating the number of −1 which the balanced state count value takes. The synthetic accumulated value is set at intervals of the predetermined time to take a value represented by the expression: (1×the accumulated 1 count value)+(−1×the accumulated −1 count value).

For example, when the sequence of the balanced state count values is 0, 1, 1, 0, −1, −1, 1, −1, 1, 1, 1, 1, 1, ..., the sequence of the accumulated 1 count values, the sequence of the accumulated 0 count values, the sequence of the accumulated −1 count values and the sequence of the synthetic accumulated values are represented as follows: the sequence of the accumulated 1 count values: 0, 1, 2, 2, 2, 2, 3, 3, 4, 5, 6, 7, 8 ... the sequence of the accumulated 0 count values: 1, 1, 1, 2, 2, 2, 2, 2, 2, 2, 2, 2 ... the sequence of the accumulated −1 count values: 0, 0, 0, 0, 1, 2, 2, 3, 3, 3, 3, 3, 3 ... and the sequence of the synthetic accumulated values: 0, 1, 2, 2, 1, 0, 1, 0, 1, 2, 3, 4, 5, ....

Each of the receiving count value and the transmission count value is provided with the maximum count value as the predetermined initial value. The main managing portion 18 is operative, at intervals of predetermined short time, to decrease by 1 one of the maximum count value of the receiving count value and the maximum count value of the transmission count value and to increase by 1 the other of the maximum count value of the receiving count value and the maximum count value of the transmission count value so that the sum of the maximum count value of the receiving count value and the maximum count value of the transmission count value is not changed when the excessive input communication signal reception state or the excessive output communication signal transmission state is recognized, and to leave each of the maximum count value of the receiving count value and the maximum count value of the transmission count value as it is when the balanced input communication signal reception/output communication signal transmission state is recognized. The variation in the maximum count value of the reception count value at intervals of the predetermined short time, such as 1, 0 or −1, and the variation in the maximum count value of the transmission count value at intervals of the predetermined short time, such as 1, 0 or −1 are also stored in the statistic information database area provided in the main memory means 17. These variations in the maximum count values can be used as useful indexes for the amount of reception and the amount of transmission.

A combination of the main managing portion 18 and the temporary managing portion 16 is operative to cause the temporary memory means 15 to keep always a certain amount of storage of the framed data for storage and a certain amount of discharge of the framed data for discharge. Therefore, when the storage amount data represent that the storage of the framed data for storage is not carried out actually in the temporary memory means 15, dummy data are stored in temporary memory means 15 so that the reception count value corresponding to, for example, almost 80 percents of the maximum count value is obtained. Similarly, when the discharge amount data represent that the discharge of the framed data for discharge is not carried out actually in the temporary memory means 15, dummy data are discharged from the temporary memory means 15 so that the transmission count value corresponding to, for example, almost 80 percents of the maximum count value is obtained. In fact, the storage of the dummy data in the temporary memory means 15 and the discharge of the dummy data from temporary memory means 15 thus carried out do not participate in increase or decrease in the reception count value, the transmission count value, the maximum count value of the reception count value or the maximum count value of the transmission count value.

The combination of the main managing portion 18 and the temporary managing portion 16 is further operative to cause the output communication signal based on the dummy date discharged from the temporary memory means 15 to be transmitted to other relay nodes each contiguous to the relay node constituted with the embodiment shown in FIG. 2 other than the communication terminal belonging to the relay node constituted with the embodiment shown in FIG. 2. Besides, the main managing portion 18 and the temporary managing portion 16 are operative to cause the storage of the dummy data in the temporary memory means 15 and the discharge of the dummy data from the temporary memory means 15 to be reduced gradually or become extinct at last in response to increase in the storage of the framed data for storage in the temporary memory means 15 and the discharge of the framed data for discharge from the temporary memory means 15.

The storage of the dummy data in the temporary memory means 15 and the discharge of the dummy data from the temporary memory means 15 thus carried out can be used for avoiding a sudden increase in the amount of storage of the framed data for storage in temporary memory means 15 so as to have smooth variations in the amount of storage of the framed data for storage in temporary memory means 15 and the amount of discharge of the framed data for discharge from temporary memory means 15.

Figure 4:
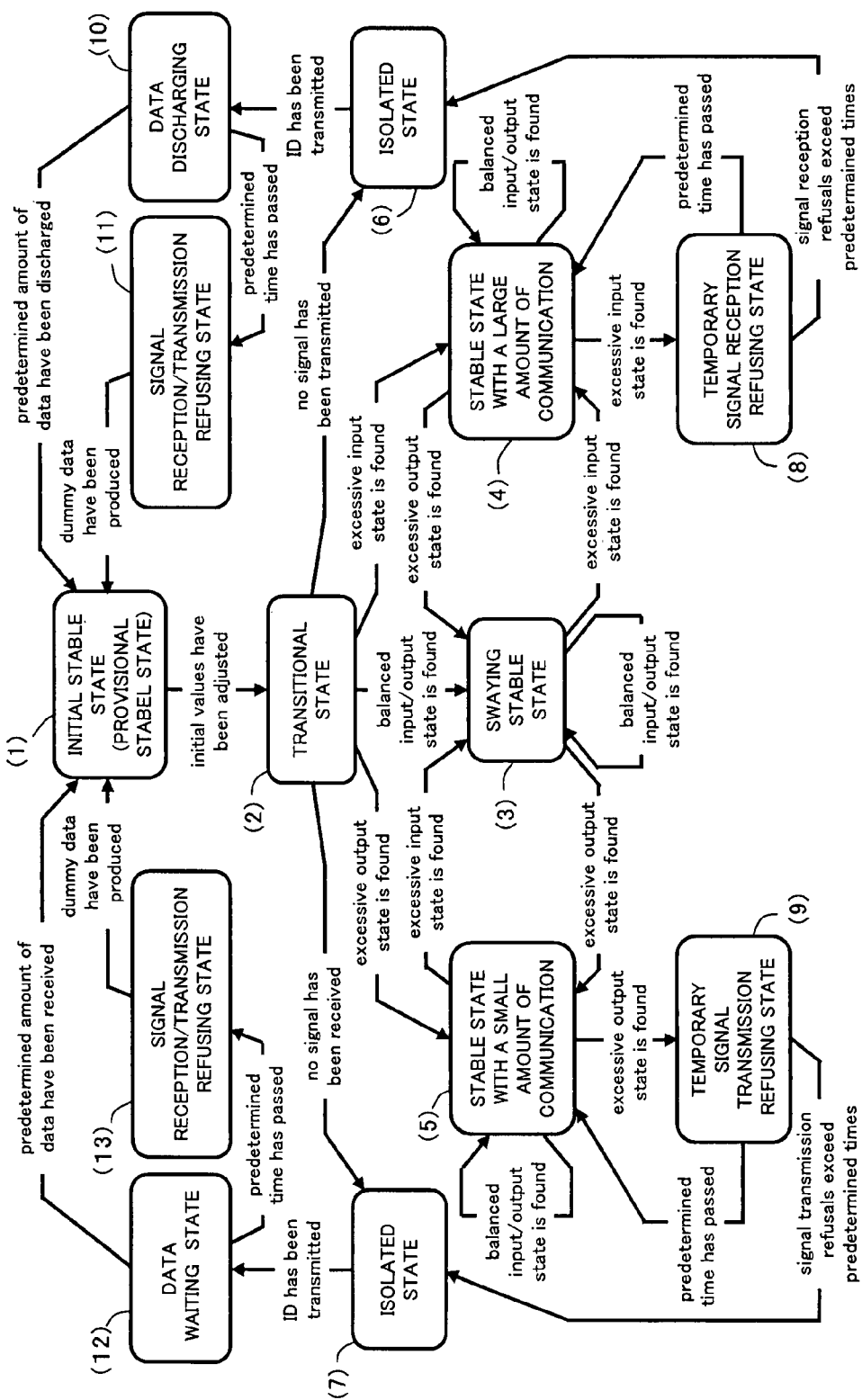
FIG. 4 is a schematic illustration used for explaining transitions between operation states in the embodiment shown in FIG. 2.

Under such a situation, the main managing portion 18 and the temporary managing portion 16 are operative to have the sum of the balanced state count values which are obtained in a period of the predetermined time to be stored in the count value area provided in the main memory means 17 in response to the excessive input communication signal reception state, the excessive output communication signal transmission state and the balanced input communication signal reception/output communication signal transmission state each recognized on the basis of the comparative result data stored in the statistic information database area provided in the main memory means 17, and to find an excessive input state when the sum of the balanced state count values obtained in the period of the predetermined time takes a positive value, an excessive output state when the sum of the balanced state count values obtained in the period of the predetermined time takes a negative value and a balanced input/output state when the sum of the balanced state count values obtained in the period of the predetermined time is zero. Then, the combination of the main managing portion 18 and the temporary managing portion 16 controls the storage of the framed data for storage or the dummy data in the temporary memory means 15 and the discharge of the framed data for discharge or the dummy data from the temporary memory means 15 in response to the excessive input state, the excessive output state or the balanced input/output state found in such a manner as mentioned above, so that the embodiment shown in FIG. 2 is put in transitions between operation states as shown in FIG. 4. Accordingly, the combination of the main managing portion 18 and the temporary managing portion 16 is able to forecast the progress of the excessive input communication signal reception state or the progress of the excessive output communication signal transmission state and then cause the input communication signal reception and the output communication signal transmission to be restrained in response to the result of the forecast.

In the transitions between operation states shown in FIG. 4, the embodiment shown in FIG. 2 is put in an initial stable state (a provisional stable state) (1) at the start of operation and shifts to a transitional state (2) when initial values have been adjusted. After the shift to the transitional state (2), the following transitions between operation states are caused in response to the result of a state check carried out at intervals of predetermined time. The shift to a swaying stable state (3) is brought about when the balanced input/output state is found as the result of the state check, the shift to a stable state with a large amount of communication (4) is brought about when the excessive input state is found as the result of the state check, and the shift to a stable state with a small amount of communication (5) is brought about when the excessive output state is found as the result of the state check.

In the swaying stable state (3), the reception count value and the transmission count value vary to increase and decrease within a predetermined range so that the balanced input/output state is maintained. In the stable state with a large amount of communication (4), the balanced input/output state in which each of the reception count value and the transmission count value is relatively large is maintained. In the stable state with a small amount of communication (5), the balanced input/output state in which each of the reception count value and the transmission count value is relatively small is maintained.

Further, the shift to an isolated state (6) is brought about when it is detected that the discharge amount data represent that the framed data for discharge has not been discharged from the temporary memory means 15 and therefore the output communication signal has not been transmitted as the result of the state check carried out in the transitional state (2), and the shift to an isolated state (7) is brought about when it is detected that the storage amount data represent that the framed data for storage has not been stored in the temporary memory means 15 and the input communication signal has not been received as the result of the state check carried out in the transitional state (2). In the isolated state (6), the input communication signal is not able to be received. In the isolated state (7), the output communication signal is not able to be transmitted.

After the shift to the swaying stable state (3), the following transitions between operation states are caused in response to the result of a state check carried out at intervals of predetermined time. The swaying stable state (3) is continuously maintained when the balanced input/output state is found as the result of the state check, the shift to the stable state with a large amount of communication (4) is brought about when the excessive input state is found as the result of the state check, and the shift to the stable state with a small amount of communication (5) is brought about when the excessive output state is found as the result of the state check.

After the shift to the stable state with a large amount of communication (4), the following transitions between operation states are caused in response to the result of a state check carried out at intervals of predetermined time. The stable state with a large amount of communication (4) is continuously maintained when the balanced input/output state is found as the result of the state check, the shift to a temporary signal reception refusing state (8) is brought about when the excessive input state is found as the result of the state check, and the shift to the swaying stable state (3) is brought about when the excessive output state is found as the result of the state check. In the temporary signal reception refusing state (8), the input communication signal is not able to be received temporarily. That is, the temporary signal reception refusing state (8) is a quasi-obstructive state wherein a temporary obstruction has occurred and the input communication signal is relayed through one or more relay nodes other than the relay node constituted with the embodiment shown in FIG. 2.

After the shift to the stable state with a small amount of communication (5), the following transitions between operation states are caused in response to the result of a state check carried out at intervals of predetermined time. The stable state with a small amount of communication (5) is continuously maintained when the balanced input/output state is found as the result of the state check, the shift to the swaying stable state (3) is brought about is brought about when the excessive input state is found as the result of the state check, and the shift to a temporary signal transmission refusing state (9) when the excessive output state is found as the result of the state check. In the temporary signal transmission refusing state (9), the output communication signal is not able to be transmitted temporarily. That is, the temporary signal transmission refusing state (9) is a quasi-obstructive state wherein a temporary obstruction has occurred.

After the shift to the temporary signal reception refusing state (8), the shift to the stable state with a large amount of communication (4) is automatically brought about when a predetermined time has passed. Then, the shift from the stable state with a large amount of communication (4) to the temporary signal reception refusing state (8) is carried out repeatedly and the shift from the temporary signal reception refusing state (8) to the isolated state (6) is brought about when the shift from the stable state with a large amount of communication (4) to the temporary signal reception refusing state (8) has been carried out repeatedly in excess of predetermined times.

After the shift to the temporary signal transmission refusing state (9), the shift to the stable state with a small amount of communication (5) is automatically brought about when a predetermined time has passed. Then, the shift from the stable state with a small amount of communication (5) to the temporary signal transmission refusing state (9) is carried out repeatedly and the shift from the temporary signal transmission refusing state (9) to the isolated state (7) is brought about when the shift from the stable state with a small amount of communication (5) to the temporary signal transmission refusing state (9) has been carried out repeatedly in excess of predetermined times.

After the shift to the isolated state (6), information (ID) representing that the input communication signal is not able to be received is transmitted to relay nodes other than the relay node constituted with the embodiment shown in FIG. 2 and then the shift to a data discharging state (10) is brought about. In the data discharging state (10), the data stored in the temporary memory means 15 are discharged. After the shift to the data discharging state (10), the shift to the initial stable state (1) is brought about when a predetermined amount of data stored in the temporary memory means 15 have been discharged before a predetermined time has passed and the shift to a signal reception/transmission refusing state (11) is brought about when the predetermined time has passed before the predetermined amount of data stored in the temporary memory means 15 have been discharged.

In the signal reception/transmission refusing state (11), a communication obstruction arises so that the reception of the input communication signal and the transmission of the output communication signal are not able to be conducted, and dummy data are produced. Then, the shift to the initial stable state (1) is brought about when a predetermined amount of dummy data have been produced.

After the shift to the isolated state (7), information (ID) representing that the output communication signal is not able to be transmitted is transmitted to relay nodes other than the relay node constituted with the embodiment shown in FIG. 2 and then the shift to a data waiting state (12) is brought about. In the data waiting state (12), the reception of the input communication signal is awaited. After the shift to the data waiting state (12), the shift to the initial stable state (1) is brought about when a predetermined amount of input communication signal has been received before a predetermined time has passed and the shift to a signal reception/transmission refusing state (13) is brought about when the predetermined time has passed before the predetermined amount of input communication signal has been received.

In the signal reception/transmission refusing state (13), a communication obstruction arises so that the reception of the input communication signal and the transmission of the output communication signal are not able to be conducted, and dummy data are produced. Then, the shift to the initial stable state (1) is brought about when a predetermined amount of dummy data have been produced.

Under the situation wherein the transitions between operation states are brought about as described above, the combination of the main managing portion 18 and the temporary managing portion 16 operates further as follows.

The combination of the main managing portion 18 and the temporary managing portion 16 forecasts whether it is likely that the shift from the stable state with a large amount of communication to temporary signal reception refusing state is brought about or not and whether it is likely that the shift from the stable state with a small amount of communication to temporary signal transmission refusing state is brought about or not on the strength of a ratio of increase in a period of predetermined time of each of the accumulated 1 count value, the accumulated 0 count value and the accumulated −1 count value stored in the count value area provided in the main memory means 17. That is, after the shift to the stable state with a large amount of communication or the shift to the stable state with a small amount of communication, it is forecasted whether the shift to the temporary signal reception refusing state or the temporary signal transmission refusing state is brought about in a short time, or the shift to the temporary signal reception refusing state or the temporary signal transmission refusing state is not brought about. In such a case, when the shift from the stable state with a large amount of communication to the temporary signal reception refusing state or the shift from the stable state with a small amount of communication to the temporary signal transmission refusing state is brought about repeatedly in a plurality of times, the forecast is amended by causing the predetermined time to be appropriate on the basis of measurement result data of a time for the shift from the stable state with a large amount of communication to the temporary signal reception refusing state or a time for the shift from the stable state with a small amount of communication to the temporary signal transmission refusing state, so that the final forecast is improved in accuracy. Then, the combination of the main managing portion 18 and the temporary managing portion 16 is operative to control the operation states in the embodiment shown in FIG. 2 in response to the result of the final forecast.

When the embodiment shown in FIG. 2 is put in the stable state with a large amount of communication, since a tendency of excessive signal reception is grasped, the dummy data stored in the temporary memory means 15 are subjected to overwriting process with the framed data for storage which arrive newly at the temporary memory means 15. In the case where the overwriting process to the dummy data can not catch up the arrival of the framed data for storage, the framed data for storage having newly arrived at the temporary memory means 15 are directly discharged to the reassembling and segmenting portion 14 and the output communication signal based on the framed data for storage having newly arrived at the temporary memory means 15 is transmitted to be processed in one or more of the relay nodes other than the relay node constituted with the embodiment shown in FIG. 2.

When the embodiment shown in FIG. 2 is put in the stable state with a small amount of communication, since a tendency of excessive signal transmission is grasped, dummy data are produced to be stored in the temporary memory means 15 whenever the framed data for storage arrive newly at the temporary memory means 15 to be stored therein. Therefore, the amount of data in the temporary memory means 15 is increased.

Further, the combination of the main managing portion 18 and the temporary managing portion 16 measures the repetitions of the shift from the stable state with a large amount of communication to the temporary signal reception refusing state and the repetitions of the shift from the stable state with a small amount of communication to the temporary signal transmission refusing state, detects the amount of reception and the amount of transmission on the basis of the reception count value, the maximum value of the reception count value, the transmission count value and the maximum value of the transmission count value stored in the statistic information database area provided in the main memory means 17, and stores measurement output data and detection output data obtained by the measurement and the detection in the statistic information database area provided in the main memory means 17. These measurement output data and detection output data are used for forecasting an overload state wherein the reception count value has reached the maximum value of the reception count value or the transmission count value has reached the maximum value of the transmission count value on the strength of the repetitions of the shift to the temporary signal reception refusing state or the shift to the temporary signal transmission refusing state.

Besides, the combination of the main managing portion 18 and the temporary managing portion 16 detects a condition in which the embodiment shown in FIG. 2 is put in the overload state before the maximum physical ability for communication of the embodiment shown in FIG. 2 reaches the limit on the basis of the reception count value, the maximum value of the reception count value, the transmission count value and the maximum value of the transmission count value stored in the statistic information database area provided in the main memory means 17. For example, when a ratio of the reception count value (the maximum value of the reception count value) to the transmission count value (the maximum value of the transmission count value) changes in such a manner as 500(1000):500(1000) →525(900):600(1100)→799(800):700(1200), 799(800) is detected as the overload state wherein the reception count value has reached the maximum value of the reception count value. Then, when it is detected that the embodiment shown in FIG. 2 is put in the overload state, the combination of the main managing portion 18 and the temporary managing portion 16 controls the reception of the input communication signal or the transmission of the output communication signal to be ceased so as to avoid a situation wherein the maximum physical ability for communication of the embodiment shown in FIG. 2 has reached the limit and the embodiment shown in FIG. 2 does not operate.

In the case where a plurality of relay nodes each constituted with the embodiment shown in FIG. 2 are dispersedly arranged in such a manner that each contiguous two of the relay nodes are placed with their communication areas overlapping partially with each other, a novel communication network, such as the communication network including the relay nodes 11a to 11i shown in FIG. 1, is constituted. In such a communication network, each of the relay nodes is operative to make a forecast and a judgment of the amount of the communication traffic flowing through the relay nodes and to control the communication traffic flowing through the relay nodes in response to the result of the forecast and the result of the judgment. Consequently, the communication traffic is dispersed over the whole communication network so that problems brought about by one or more bottlenecks formed in the communication network to result from the convergence of the communication traffic induced in one or more relay nodes in the communication network can be avoided surely and effectively.

APPLICABILITY FOR INDUSTRIAL USE

As apparent from the above description, the communication apparatus can be broadly applied to constitute each of relay nodes provided to constitute a novel communication network, with which advantages exceeding the advantages obtained with the known mesh network are obtained, and which avoids the problems brought about by one or more bottlenecks formed in the communication network to result from the convergence of communication traffic induced in one or more relay nodes in the communication network.

The invention claimed is:
1. A communication apparatus comprising;
    a signal receiving and transmitting portion operative to receive an input communication signal for obtaining an input information signal and to transmit an output communication signal based on an output information signal,
    a reassembling and segmenting portion operative to cause the input information signal to be subjected to reassembling process for obtaining a first framed data which forms a data frame containing a frame header segment wherein identification information is provided and an information segment wherein communication information is provided and to cause a second framed data which forms a data frame containing a header segment wherein processed identification information is provided and an information segment wherein communication information is provided to be subjected to segmenting process for obtaining the output information signal,
    temporary memory means for storing temporarily the first framed data obtained from the reassembling and segmenting portion and for storing temporarily the second framed data and then discharging the second framed data stored therein to the reassembling and segmenting portion,
    main memory means for storing the identification information contained in the first framed data in the temporary memory means and read from the temporary memory means to preserve the same as an arranged information and for discharging the identification information stored therein or the identification information having been subjected to modifying process to the temporary memory means as the processed identification information,
    a temporary managing portion operative to control operations in the temporary memory means for storing temporarily therein the first and second framed data,
    a main managing portion operative to control operations in the main memory means for storing and preserving the identification information and discharging the processed identification information, and
    an operation control portion operative to cause the temporary managing portion and the main managing portion to determine the amount of input communication signal reception and the amount of output communication signal transmission on the basis of the amount of first framed data storage at intervals of predetermined time and the amount of second framed data discharge at intervals of predetermined time, to compare the amount of input communication signal reception with the amount of output communication signal transmission, and to store comparative result data representing the result of the comparison in the temporary memory means or the main memory means, operative to find an excessive input state, an excessive output state or a balanced input/output state on the basis of an excessive input communication signal reception state, an excessive output communication signal transmission state and a balanced input communication signal reception/output communication signal transmission state recognized based on the comparative result data stored in the temporary memory means or the main memory means, and operative to cause the input communication signal reception and the output communication signal transmission to be restrained in response to the found excessive input state, excessive output state or balanced input/output state.

2. A communication apparatus according to claim 1, wherein said temporary managing portion is operative to show the amount of first framed data storage at intervals of predetermined time with storage amount data and the amount of second framed data discharge at intervals of the determined time with discharge amount data.

3. A communication apparatus according to claim 2, wherein said main managing portion is operative to obtain the comparative result data by comparing the reception count value representing the amount of input communication signal reception obtained based on the storage amount data at intervals of the predetermined time with the transmission count value representing the amount of output communication signal transmission obtained based on the discharge amount data at intervals of the predetermined time, and to recognize the excessive input communication signal reception state when the comparative result data represent that the reception count value is larger that the transmission count value, the excessive output communication signal transmission state when the comparative result data represent that the reception count value is smaller that the transmission count value, and the balanced input communication signal reception/output communication signal transmission state when the comparative result data represent that the reception count value is equal to the transmission count value.

4. A communication apparatus according to claim 3, wherein a combination of said main managing portion and said temporary managing portion is operative to shift an operation state for receiving the input communication signal or transmitting the output communication signal from a stable state to a reception refusing state, from the reception refusing state to the stable state, from the stable state to a transmission refusing state or from the transmission refusing state to the stable state in response to the excessive input communication signal reception state, the excessive output communication signal transmission state or the balanced input communication signal reception/output communication signal transmission state recognized on the basis of the comparative result data obtained at intervals of the predetermined time.

5. A communication apparatus according to claim 1, wherein said main managing portion is operative to forecast a result brought about by progress of the excessive input communication signal reception state or a result brought about by progress of the excessive output communication signal transmission state in response to changes in the comparative result data obtained at intervals of the predetermined time.

* * * * *